United States Patent
Vyskocil et al.

(10) Patent No.: US 9,821,692 B2
(45) Date of Patent: Nov. 21, 2017

(54) DEPLOYABLE LEG REST ASSEMBLY

(71) Applicant: Jaguar Land Rover Limited, Coventry (GB)

(72) Inventors: Henry Vyskocil, Coventry (GB); John Heath, Coventry (GB)

(73) Assignee: Jaguar Land Rover Limited, Whitley, Coventry (GB)

(*) Notice: Subject to any disclaimer, the term of this patent is extended or adjusted under 35 U.S.C. 154(b) by 0 days.

(21) Appl. No.: 15/036,956

(22) PCT Filed: Nov. 19, 2014

(86) PCT No.: PCT/EP2014/075004
§ 371 (c)(1),
(2) Date: May 16, 2016

(87) PCT Pub. No.: WO2015/075066
PCT Pub. Date: May 28, 2015

(65) Prior Publication Data
US 2016/0288673 A1 Oct. 6, 2016

(30) Foreign Application Priority Data
Nov. 19, 2013 (GB) .................................. 1320404.5

(51) Int. Cl.
*A47C 7/50* (2006.01)
*A47C 20/04* (2006.01)
(Continued)

(52) U.S. Cl.
CPC ......... *B60N 2/4495* (2013.01); *B60N 2/0232* (2013.01); *B60N 2/42763* (2013.01); *B60N 2002/024* (2013.01)

(58) Field of Classification Search
CPC ............. B60N 2/42763; B60N 2/0232; B60N 2/4495; B60N 2002/024
(Continued)

(56) References Cited

U.S. PATENT DOCUMENTS 5,560,681 A * 10/1996 Dixon .................. B60N 2/4495
297/423.26 X
6,773,074 B2 * 8/2004 Flory ..................... B60N 3/063
297/423.26 X
(Continued)

FOREIGN PATENT DOCUMENTS

DE 20 2007 000484 U1 5/2008
WO WO 2012/053022 A1 4/2012

OTHER PUBLICATIONS

Combined Search and Examination Report, GB 1320404.5, dated Jun. 17, 2014, 6 pages.
(Continued)

*Primary Examiner* — Rodney B White
(74) *Attorney, Agent, or Firm* — Myers Bigel, P.A.

(57) ABSTRACT

A deployable leg rest assembly (3) for mounting to a seat pan (9) of a vehicle seat frame (11) comprises a leg support (4), a mounting plate (13) and a deployment mechanism (6) for deploying the leg support (4). The deployment mechanism (6) connects the leg support (4) to the mounting plate (13). The mounting plate (13) is adapted to be located above the seat pan (9). The deployable leg rest assembly (3) can be mounted to different vehicle seats (1) by accessing the seat pans (9) of the corresponding vehicle seat frames (11).

17 Claims, 7 Drawing Sheets

(51) Int. Cl.
  *B60N 2/44* (2006.01)
  *B60N 2/427* (2006.01)
  *B60N 2/02* (2006.01)
(58) Field of Classification Search
  USPC .......................... 297/423.26, 423.27, 423.28
  See application file for complete search history.

(56) References Cited

U.S. PATENT DOCUMENTS

| | | | | |
|---|---|---|---|---|
| 7,824,349 B2* | 11/2010 | Lv | ..................... | A61H 7/007 |
| | | | | 297/423.28 X |
| 7,850,245 B2* | 12/2010 | Ton | ..................... | A47C 1/04 |
| | | | | 297/423.26 |
| 7,866,755 B2* | 1/2011 | Okano | ................. | B60N 2/0232 |
| | | | | 297/423.26 X |
| 2005/0012377 A1* | 1/2005 | Ito | ....................... | B60N 2/0232 |
| | | | | 297/423.26 |
| 2005/0173963 A1* | 8/2005 | Edrich | ................ | B60N 2/4495 |
| | | | | 297/423.28 |
| 2008/0315659 A1* | 12/2008 | Schacht | ............ | B60N 2/01583 |
| | | | | 297/423.28 |
| 2009/0273220 A1* | 11/2009 | Kim | ..................... | B60N 2/0232 |
| | | | | 297/423.28 |
| 2012/0091779 A1 | 4/2012 | Chang et al. | | |
| 2013/0045824 A1 | 2/2013 | Yin et al. | | |
| 2015/0115685 A1* | 4/2015 | Lee | ......................... | A47C 7/52 |
| | | | | 297/423.26 |
| 2016/0331609 A1* | 11/2016 | Cheng | ................... | B60N 3/063 |
| 2016/0374476 A1* | 12/2016 | Wu | ....................... | A47C 7/506 |
| | | | | 297/423.28 |

OTHER PUBLICATIONS

Notification of Transmittal of the International Search Report and the Written Opinion of the International Searching Authority, or the Declaration, PCT/EP2014/075004, dated Feb. 4, 2015, 10 pages.

* cited by examiner

DEPLOYABLE LEG REST ASSEMBLY

RELATED APPLICATIONS

This application is a 35 U.S.C. §371 national stage application of PCT Application No. PCT/EP2014/075004, filed on Nov. 19, 2014, which claims priority from Great Britain Patent Application No. 1320404.5 filed on Nov. 19, 2013, the contents of which are incorporated herein by reference in their entireties. The above-referenced PCT International Application was published in the English language as International Publication No. WO 2015/075066 A1 on May 28, 2015.

TECHNICAL FIELD

The present disclosure relates to a deployable leg rest assembly for mounting to a seat pan of a vehicle seat frame. More particularly, the present invention relates to a deployable leg rest assembly for mounting to a rear vehicle seat frame for a passenger-carrying vehicle. The present invention also relates to a vehicle seat frame; to a vehicle seat; to a vehicle; and to a method of mounting a deployable leg rest assembly to a seat pan of a vehicle seat frame.

BACKGROUND

It is known to provide deployable leg rests to allow passengers of vehicles to lounge in the vehicle seats when desired. However, existing leg rest designs carry a number of limitations. Certain leg rest designs tend to inhibit other seat movements such as reclining, longitudinal and/or vertical (height) adjustment. Other leg rest designs are only suitable to be provided in conjunction with bespoke seats, or require substantial modification of the seat frame.

At least in certain embodiments, the present invention sets out to overcome or ameliorate shortcomings of known deployable leg rests.

SUMMARY OF THE INVENTION

Aspects of the present invention relate to a deployable leg rest assembly for mounting to a seat pan of a vehicle seat frame; to a vehicle seat frame; to a vehicle seat; to a vehicle; and to a method of mounting a deployable leg rest assembly to a seat pan of a vehicle seat frame.

According to an aspect of the present invention, there is provided a deployable leg rest assembly for a vehicle seat, the deployable leg rest assembly comprising:
a leg support;
a mounting plate for mounting to a seat pan of a vehicle seat frame; and
a deployment mechanism for deploying the leg support, the deployment mechanism connecting the leg support to the mounting plate;
wherein the mounting plate is arranged to be mounted on top of the seat pan of the vehicle seat frame. The mounting plate can be mounted to the seat pan during assembly of the seat. Alternatively, at least in certain embodiments, the mounting plate can be retro-fitted to the seat pan. When deployed, the leg support is configured to support at least a portion of the legs of an occupant of the vehicle seat. The leg support described herein can take the form of a calf rest. The deployable leg rest assembly may also comprise an actuating apparatus for actuating said deployment mechanism, wherein the actuating apparatus may be located beneath a front portion of the mounting plate.

The mounting plate can be profiled at least substantially to match the profile of the seat pan. A first portion of the mounting plate can be profiled at least substantially to match a second portion of the seat pan. These first and second profiles can be linear, or can be defined by corresponding and/or cooperating surfaces or regions of, respectively, the first and second portions. These corresponding and/or cooperating surfaces can comprise a lower surface of the mounting plate, and the other an upper surface of the seat pan.

In some embodiments, the mounting plate is adapted to be mounted to the seat pan in a face-to-face relationship.

The seat pan is typically formed from a sheet material and can provide support for a seat squab. The seat pan can extend between right and left side members of the vehicle seat frame. The mounting plate can extend transversely across a transverse length of the seat pan. The transverse length of the seat pan can be measured with respect to a transverse direction defined by the vehicle seat frame. The transverse direction defined by the vehicle seat frame can be generally from a left side to a right side of the vehicle seat.

The mounting plate can extend longitudinally along a longitudinal length of the seat pan. The longitudinal length of the seat pan can be measured with respect to a longitudinal direction defined by the seat frame. The longitudinal direction defined by the vehicle seat frame can be generally from a back side to a front side of the vehicle seat frame.

In some embodiments, an underside of the mounting plate can be configured to cover, or overlap with, all, or the majority of, the upper surface of the seat pan when the mounting plate has been mounted to the seat pan.

The mounting plate may be inclined so as to provide an anti-submarining feature. The mounting plate may provide a ramp. Advantageously, a mounting plate shaped in this way may provide reinforcement to the seat pan, improving any anti-submarining effect provided by the seat pan itself. The mounting plate may be inclined relative to the seat pan so as to provide an anti-submarining feature. The mounting plate may beneficially provide an anti-submarining effect independently from the seat pan.

The mounting plate may have a generally S-shaped longitudinal cross section according to a longitudinal plane passing through the mounting plate, A front portion of the mounting plate may be disposed vertically above a rear portion of the mounting plate.

The mounting plate can be adapted for mounting to the seat pan by a plurality of mechanical fasteners. For example, the mounting plate can be adapted to be bolted or riveted to the seat pan. Alternative fastening methods can however be used.

The mounting plate can also be adapted to be supported at a first side and/or a second side of the vehicle seat frame. In some embodiments, the mounting plate can be supported on the right and left sides of the vehicle seat frame. The mounting plate can have one or more pairs of side brackets projecting from opposite sides of the mounting plate adapted to be supported on opposite sides of the vehicle seat frame. The mounting plate can define a first outer perimeter having a first shape which generally matches or at least partially follows a second shape of a second perimeter defined by the seat pan.

A first end of the mounting plate can be configured to be located towards a back of the vehicle seat frame. The second end of the mounting plate can be configured to be fitted towards a front end of the vehicle seat frame.

The mounting plate can comprise one or more apertures. In some embodiments, the one or more apertures can be used to implement a cooling and/or a heating function of the vehicle seat. In use, the one or more apertures can be in fluid communication with one or more sources of hot and/or cool air.

In some embodiments, the mounting plate can comprise one or more reinforcing elements. The one or more reinforcing elements can comprise thickened regions of the mounting plate. The one or more reinforcing elements can comprise one or more reinforcing plates and/or flanges. One or more reinforcing flanges can extend out-of-plane with respect to the mounting plate. In some embodiments, the reinforcing flanges can extend perpendicularly, or at least substantially perpendicularly, from the mounting plate. One or more reinforcing flanges can extend transversely. One or more reinforcing flanges can extend longitudinally. One or more reinforcing flanges can extend longitudinally along all, or a greater part of, longitudinally extending sides of the mounting plate. In some embodiments, there can be a pair of opposing reinforcing flanges, each extending perpendicularly from the mounting plate, and each extending longitudinally along the longitudinally extending sides of the mounting plate. These flanges can be parallel and/or symmetrically configured.

The deployment mechanism connecting the leg support to the mounting plate can be adapted to rotate and translate the leg support to a deployed configuration. Alternatively, the deployment mechanism can only rotate and/or only translate the leg support to the deployed configuration. The deployment mechanism can also be operated reversibly, i.e. to deploy and then retract the leg support to a retracted (or stowed) configuration. There can be more than one deployed configurations and/or more than one retracted configurations. In some embodiments, there can be a single retracted configuration. The retracted configuration can correspond to a generally perpendicular configuration of the leg support with respect to the mounting plate.

The deployment mechanism can comprise one or more four-bar linkage arrangements. The one or more four-bar linkage arrangements can be configured to longitudinally extend away from the mounting plate when the leg support is deployed. The one or more four-bar linkage arrangements can be supported by, or in conjunction with, a first transversely extending spindle fixedly connected, or connectable, to the mounting plate. The one or more four-bar linkage arrangements can also carry a second transversely extending spindle, such that the second transversely extending spindle can move away from the mounting plate and/or from the first transversely extending spindle when the one or more four-bar linkage arrangements are operated to deploy the leg support. The second transversely extending spindle can be at least substantially parallel to the first transversely extending spindle. The one or more four-bar linkage arrangements can each be pivotally connected to the mounting plate, optionally to the second end of the mounting plate. In some embodiments, there can be a pair of opposing four-bar linkage arrangements, each positioned at a respective end of the first transversely extending spindle. The second transversely extending spindle can be connected to and extend between the opposing four-bar linkage arrangements.

The deployment mechanism can comprise one or more scissor-type assemblies. The leg support can be connected to the one or more scissor-type assemblies. In some embodiments, there can be a pair of opposite scissor-type assemblies, each provided in correspondence with one of the opposing four-bar linkage arrangements. Each scissor-type assembly can be mounted partway through the second transversely extending spindle. Each scissor-type assembly can comprise an intersection element. Each intersection element can be an extended bar. Each extended bar can comprise a pivotal articulation located partway along the extended intersecting bar. This pivotal articulation can be with the second transversely extending spindle. The rear ends of the extended bars can each be connected to a respective supporting element fixedly connected to the first transversely extending spindle. The front ends of these extended bars can each be pivotally connected to a respective lower supporting bar for supporting the leg support. Each scissor-type assembly can also comprise a respective upper supporting bar for supporting the leg support. Each upper supporting bar can be pivotally connected, at a rear end thereof, to the second transversely extending spindle, and at a front end thereof to the leg support. Each upper supporting bar can connect to the second transversely extending spindle adjacent the pivotal articulation formed by the corresponding extended bar and the second transversely extending spindle. The extended bars can each be configured to maintain a generally parallel relationship with a corresponding upper bar of the four-bar linkage arrangement located on the same side of the deployment mechanism. When the scissor-type assemblies are operated to retract the leg support, the front ends of, respectively, the extended bars and the upper supporting bars can be spaced apart ones from the others. When the scissor-type assemblies are operated to deploy the leg support, the front ends of the extended bars and the uppers supporting bars can be brought closer the ones to the others.

The leg support can be mounted to the one or more scissor-type assemblies. The leg support can be mounted to the front ends of the upper and lower supporting bars. The leg support can be supported by a supporting plate. The supporting plate can be pivotally mounted to the upper and lower supporting bars. The lower supporting bar can be pivotally connected partway along an underside of the supporting plate. The upper supporting bar can be pivotally connected to an end of the supporting plate. A front end of the supporting plate can be a free end.

The leg support can be configured in a cantilevered arrangement on the vehicle seat frame, when the mounting plate is mounted to the seat pan.

The leg support can comprise a frame component. The frame component can be made of a first plastic. The frame component can be formed as a single injection-moulded component. The frame component can comprise reinforcing ribs on an underside thereof. The frame component can be covered with a trim material. The trim material can be a second plastic. A cushioning material can be provided between the trim material and the frame component. The trim material can be leather.

The deployable leg rest assembly can comprise an actuator for actuating the deployment mechanism. The actuator can comprise an electric motor, for example in driving engagement with a lead screw. The actuator can comprise a gearbox coupled to the electric motor. The electric motor can be mounted to an underside of the mounting plate. In some embodiments, the electric motor can be pivotally supported on the first transversely extending spindle. Alternatively, the electric motor can be connected, or pivotally connected, to an underside of a second end of the mounting plate.

The lead screw actuator can actuate the four-bar linkage arrangement(s). In some embodiments, the lead screw actuator can also actuate the scissor-type assembly(s). In some embodiments, the lead screw actuator can be connected, or pivotally connected, to the second transversely extending spindle so as to simultaneously actuate the opposing four-bar linkage arrangements and corresponding opposing scissor-type assemblies.

The deployment mechanism can be adapted to be received and mounted to a front of the mounting plate. The actuator can be disposed at a front of the mounting plate for positioning in front of the seat pan.

The actuator and/or the electric motor and/or the gearbox and/or the lead screw actuator can be accommodated adjacent to the front of the mounting plate. The actuator and/or the electric motor and/or the gearbox and/or the lead screw actuator can be accommodated beneath the front portion of the mounting plate. The front portion of the mounting plate may define a cavity for receiving the actuator.

The deployable leg rest assembly can comprise one or more side gap hiders arranged to hide at least a portion of the deployment mechanism for deploying the leg support when the leg support is in a, or the, deployed configuration and is viewed from a side of the vehicle seat frame.

According to another aspect of the present invention, there is provided a vehicle seat frame comprising a seat pan and a deployable leg rest assembly as described herein. The vehicle seat frame can be adapted to accommodate one or more seat frame movements.

According to another aspect of the present invention, there is provided a vehicle seat comprising a vehicle seat frame as described herein. The vehicle seat can be a rear vehicle seat. The vehicle seat can be a heated and/or cooled vehicle seat. The vehicle seat can be an adjustable vehicle seat. Adjustments provided by the vehicle seat can comprise: reclining; height adjustment, longitudinal position adjustment; and lumbar adjustment.

According to another aspect of the present invention, there is provided a vehicle comprising a vehicle seat as described herein. The vehicle can be an extended wheelbase vehicle.

According to another aspect of the present invention, there is provided a deployable leg rest assembly for mounting to a vehicle seat frame, the deployable leg rest assembly comprising:
 a leg support;
 a mounting plate for mounting to a seat pan;
 a deployment mechanism for deploying the leg support, the deployment mechanism connecting the leg support to the mounting plate; and
 an actuating apparatus for actuating said deployment mechanism;
 wherein the actuating apparatus is located beneath a front portion of the mounting plate. The actuating apparatus can comprise an electric drive motor for actuating said deployment mechanism. When assembled, the leg rest assembly is mounted to the seat pan. The actuating apparatus can be disposed in front of the seat pan. The actuating apparatus can be located beneath a front portion of the seat, for example a thigh-support section of a seat squab supported by the mounting plate. At least in certain embodiments, locating the actuating apparatus in this frontal region allows the other seat functions to be performed without interference.

According to another aspect of the present invention, there is provided a method of mounting a deployable leg rest assembly to a seat pan of a vehicle seat frame, the method comprising:
 providing a deployable leg rest assembly comprising a mounting plate adapted to be located above the seat pan; and
 mounting the mounting plate to the seat pan.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which.

DETAILED DESCRIPTION

Figure 1:
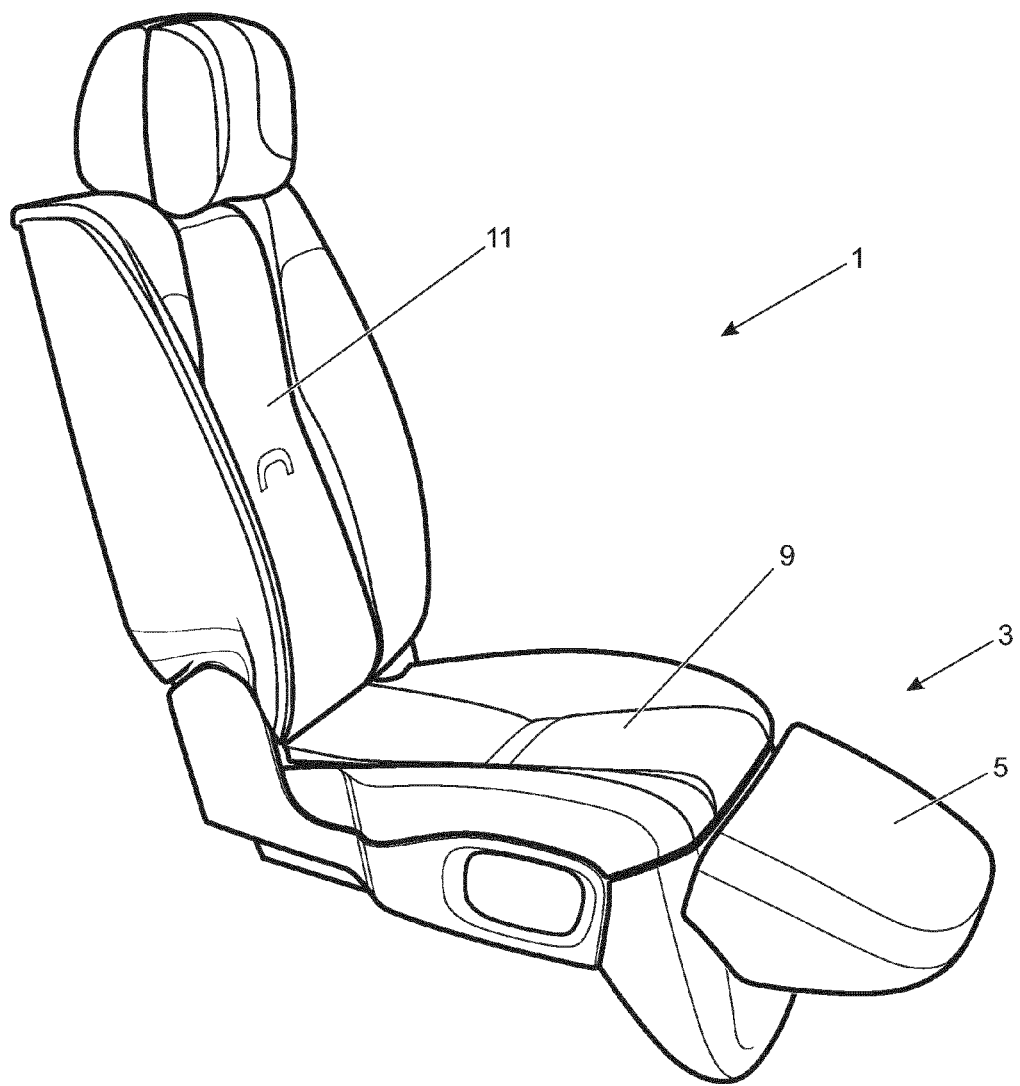
FIG. 1 is a side perspective view of a vehicle seat with a deployable leg rest assembly according to an embodiment of the present invention.

A vehicle seat 1 for a motor vehicle (not shown) provided with a deployable leg rest assembly 3 according to an embodiment of the present invention is shown in FIG. 1. The vehicle seat 1 described herein is a forward-facing seat, but the invention could equally be implemented in a rearward-facing seat.

The terms "front" and "back" used herein are to be given their conventional meanings in relation to the vehicle seat 1. In particular, an occupant seated in the vehicle seat 1 faces towards the front of the seat with their back towards the back of the seat. The terms left and right are used to describe the respective sides of the vehicle seat 1 when viewed from the back facing forwards. The term "longitudinal" (and derivatives thereof) is used herein with reference to a longitudinal axis of the vehicle (X-axis). The term "transverse" (and derivatives thereof) is used herein with reference to a transverse axis of the vehicle (Y-axis). The term "vertical" (and derivatives thereof) is used herein with reference to a vertical axis of the vehicle (Z-axis).

The leg rest assembly 3 can be used to support the legs (particularly the calves) of an occupant (not shown) of the vehicle seat 1. The leg rest assembly 3 has a leg support 5 which is deployable between a retracted (undeployed) configuration and a deployed configuration, both configurations being shown in FIG. 1. The leg rest assembly 3 comprises a deployment mechanism 7 which connects the leg support 5 to a mounting plate 13 and can be operated selectively to deploy the leg support 5. The leg support 5 in the present embodiment takes the form of a calf rest for supporting the calf region of an occupant's legs.

The vehicle seat 1 comprises a seat squab 9 and a backrest 11 which are both supported by a seat frame 12. The vehicle seat frame 12 is mounted to side rails 15 fixedly mounted to a vehicle floor. The seat squab and the backrest are omitted from FIGS. 2A and 2B to show the seat frame 12 to which the leg rest assembly 3 is mounted. The leg rest assembly 3 comprises a mounting plate 13 which is mounted to the seat frame 12. In a conventional vehicle seat, the seat squab is supported directly on a seat pan 17 formed from sheet metal and supported by the seat frame 12. In the present embodiment, the mounting plate 13 is mounted on top of the seat pan 17 and the seat squab 9 is supported by the mounting plate 13. The vehicle seat 1 is slidably mounted on the side rails 15. The backrest 11 is pivotally mounted to the seat frame 12 to allow the incline angle to be adjusted. The height and/or orientation of the seat squab 9 could optionally also be adjustable.

Figure 3:
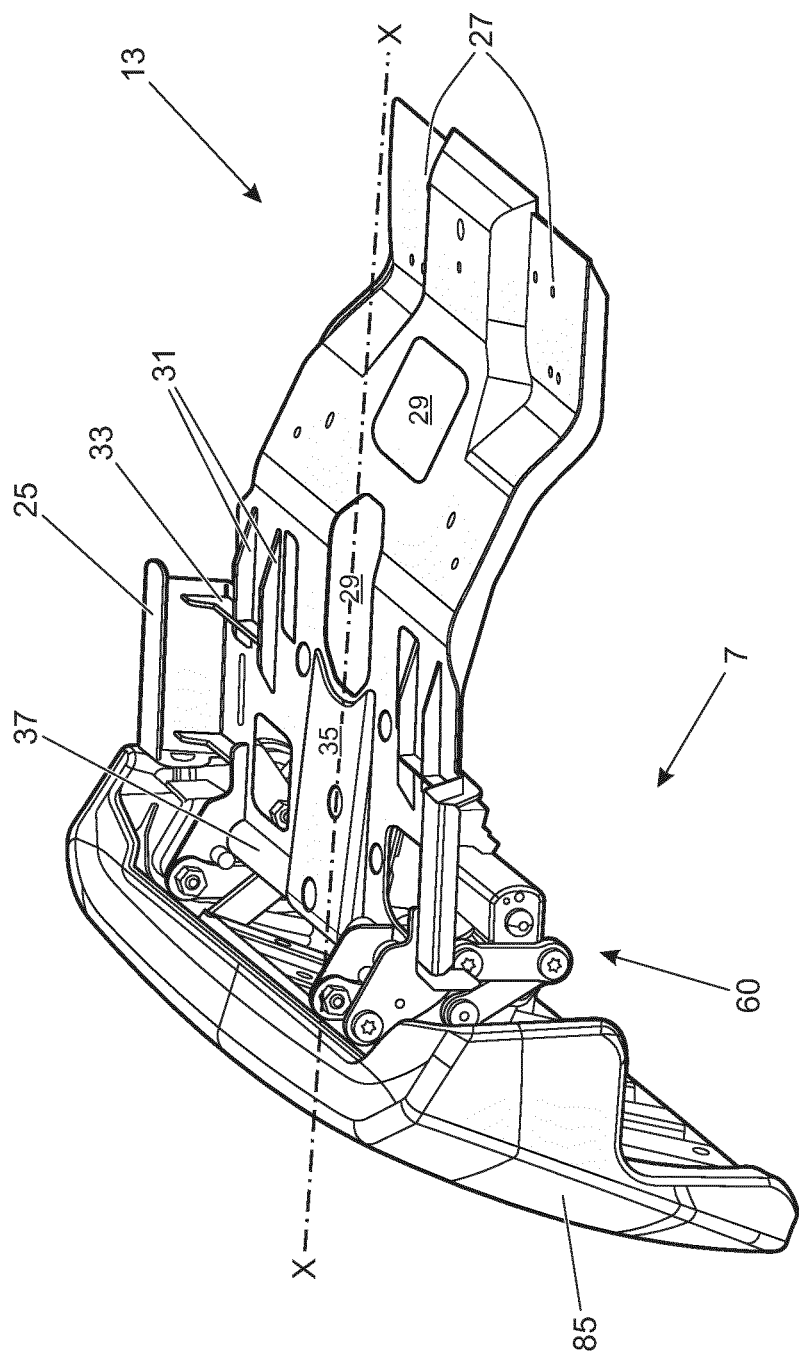
FIG. 3 is a top perspective view of the deployable leg rest assembly in the retracted configuration.

The mounting plate 13 is press-formed from sheet metal and has a profile which at least substantially matches and complements that of the seat pan 17. In the present embodiment, the mounting plate 13 is mounted in face-to-face arrangement with the seat pan 17. The seat pan 17 has a raised front end for providing under-thigh support for the seat occupant. As shown in FIG. 3, the mounting plate 13 has a cooperating profile and, when assembled, abuts against the upper surface of the seat pan 17. The mounting plate 13 is thus inclined towards a front end of the mounting plate so as to provide an anti-submarining feature.

The perimeter of the mounting plate 13 also generally matches that of the seat pan 17. Embodiments wherein the perimeter of the mounting plate 13 only partially matches that of the seat pan 17 are however also contemplated.

Figure 2:
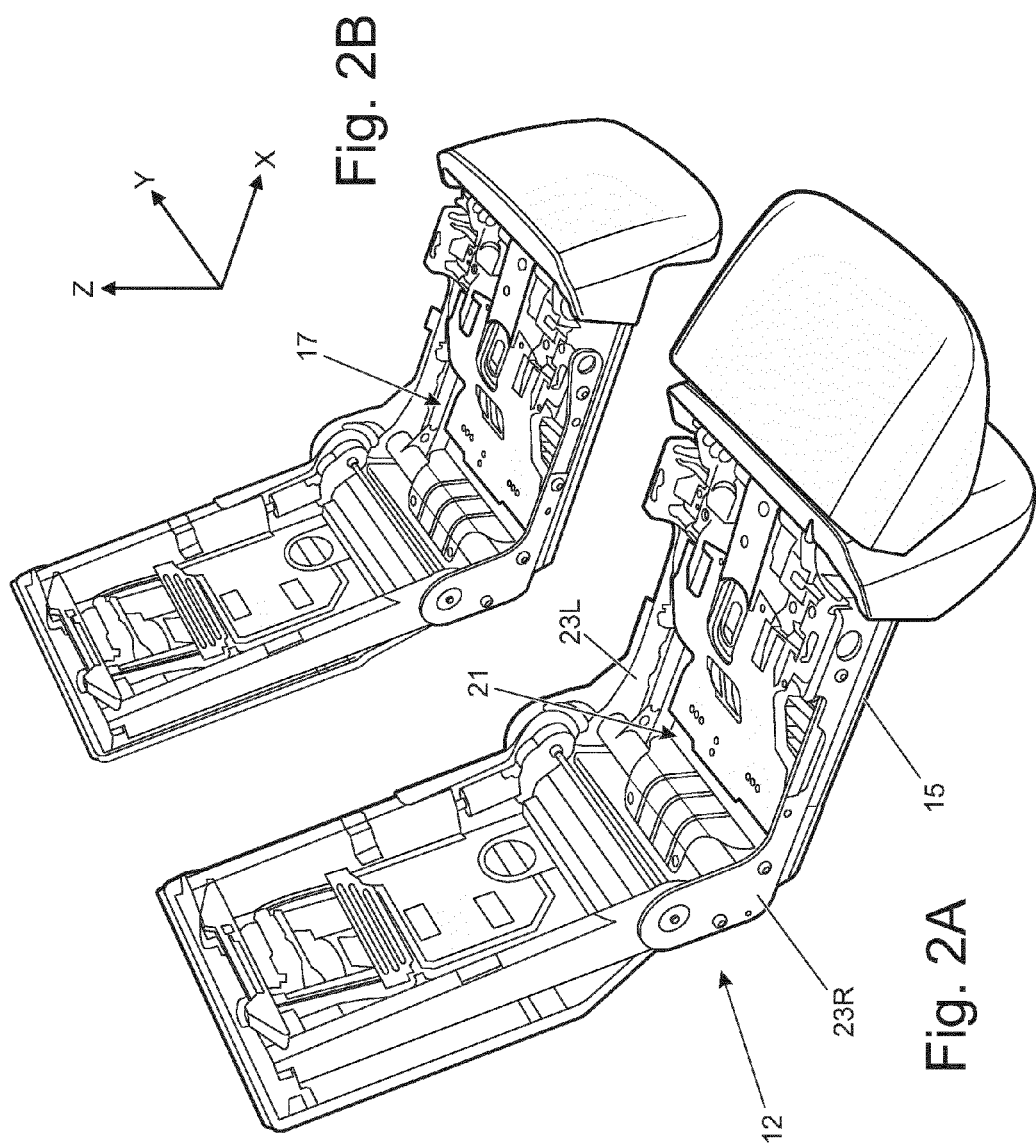
FIG. 2A is a side perspective view of a vehicle seat frame with the deployable leg rest assembly with a leg support shown in a retracted configuration and in a deployed configuration.
FIG. 2B is a side perspective view of the vehicle seat frame of FIG. 2A with the leg support shown in the retracted configuration.

A lower surface 19 of the mounting plate 13 engages a corresponding upper surface 21 of the seat pan 17. The mounting plate 13 extends transversely across the full width of the longitudinal length of the seat pan 17. Moreover, the mounting plate 13 extends longitudinally to cover most of the depth of the seat pan 17. The seat pan 17 extends transversely between right and left side plates 23R, 23L of the vehicle seat frame 12, as shown in FIGS. 2A and 2B. Embodiments wherein the mounting plate 13 extends across the whole width of the seat pan 17 but not across the whole depth of the seat pan 17 are however contemplated.

First and second transverse brackets 25 are formed integrally with the mounting plate 13. The transverse brackets 25 extend laterally from the right and left side plates 23R, 23L of the mounting plate 13 and are arranged to support the lateral sides of the seat squab 9 when it is located in position. The transverse brackets 25 may also facilitate handling of the leg rest assembly 3 during assembly.

A plurality of apertures 27 are formed through the mounting plate 13 for receiving rivets (not shown) for fixedly mounting the mounting plate 13 to the seat pan 17. Alternative fastening methods for mounting the mounting plate 13 to the seat pan 17 can however be used. For example, threaded connecting elements can be used in place of the rivets, or the mounting plate 13 could be welded or bonded to the seat pan 17. The apertures 27 are distributed symmetrically around a longitudinal axis X-X of the mounting plate 13, as shown in FIG. 3.

Figure 4:
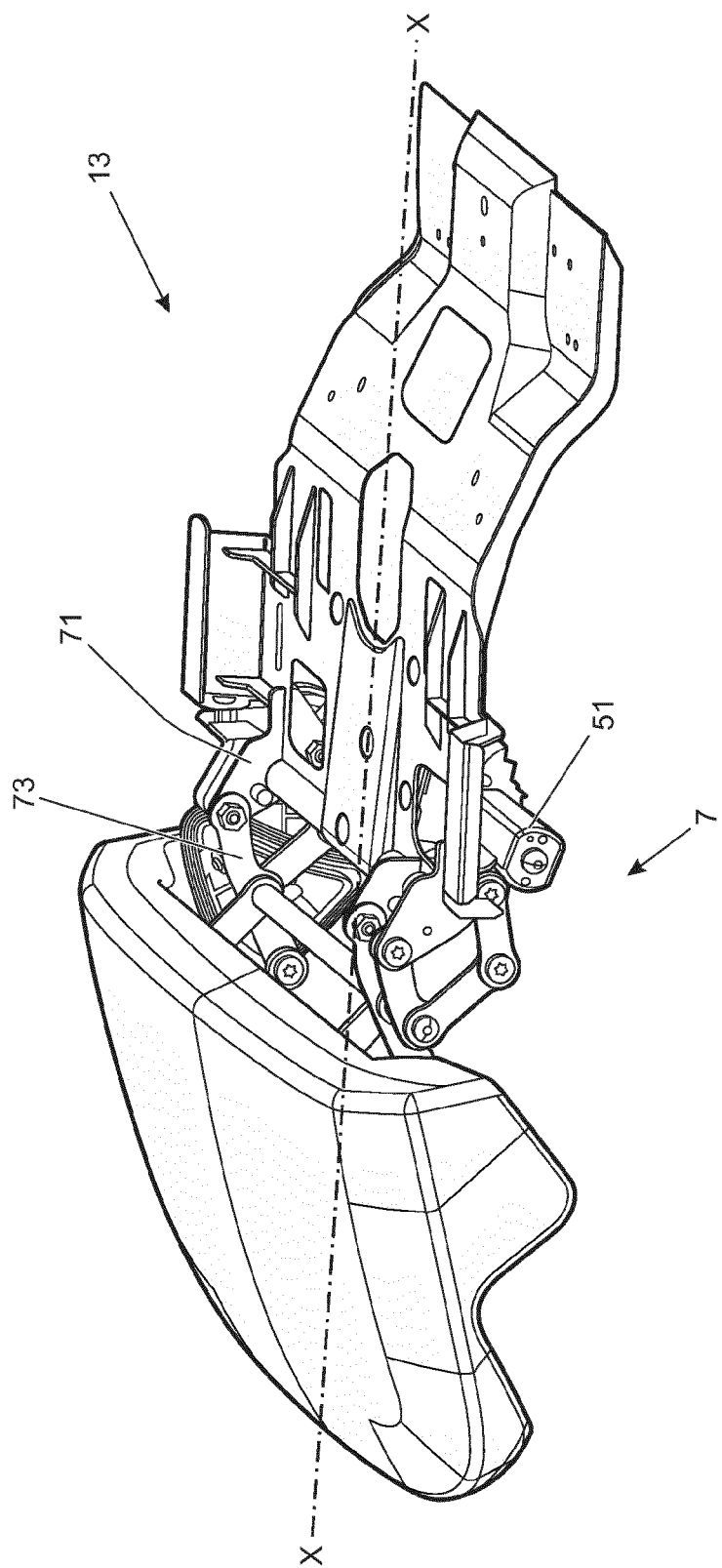
FIG. 4 is a top perspective view of the deployable leg rest assembly in the deployed configuration.

Two rectangular apertures 29 are also present on the mounting plate 13, located along the longitudinal axis X-X, as shown in FIGS. 3 and 4. The rectangular apertures 29 are used for supplying heated/cooled air to the underside of the seat squab 9 to perform heating/cooling functions.

FIGS. 3 and 4 show the deployment mechanism 7 which operates to deploy and retract the leg support 5. With reference to FIG. 3, when the leg support 5 is in the retracted configuration, the deployment mechanism 7 is folded and the leg support 5 is arranged generally perpendicular to the mounting plate 13. With reference to FIG. 4, when the leg support 5 is in the deployed configuration, the deployment mechanism 7 is extended and the leg support 5 is an extension of the seat squab 9.

As shown in FIGS. 3 and 4, the mounting plate 13 is provided with upper reinforcement structures as follows: two pairs of longitudinally extending ribs 31; two transversely extending ribs 33, each intersecting a corresponding one of each pair of longitudinally extending ribs 31; and an upper reinforcing plate 35 extending longitudinally along the longitudinal axis X-X. This upper reinforcing plate 35 fixedly mounts a first transverse spindle 37 disposed at a front end of the mounting plate 13 for supporting the deployment mechanism 7.

Figure 5:
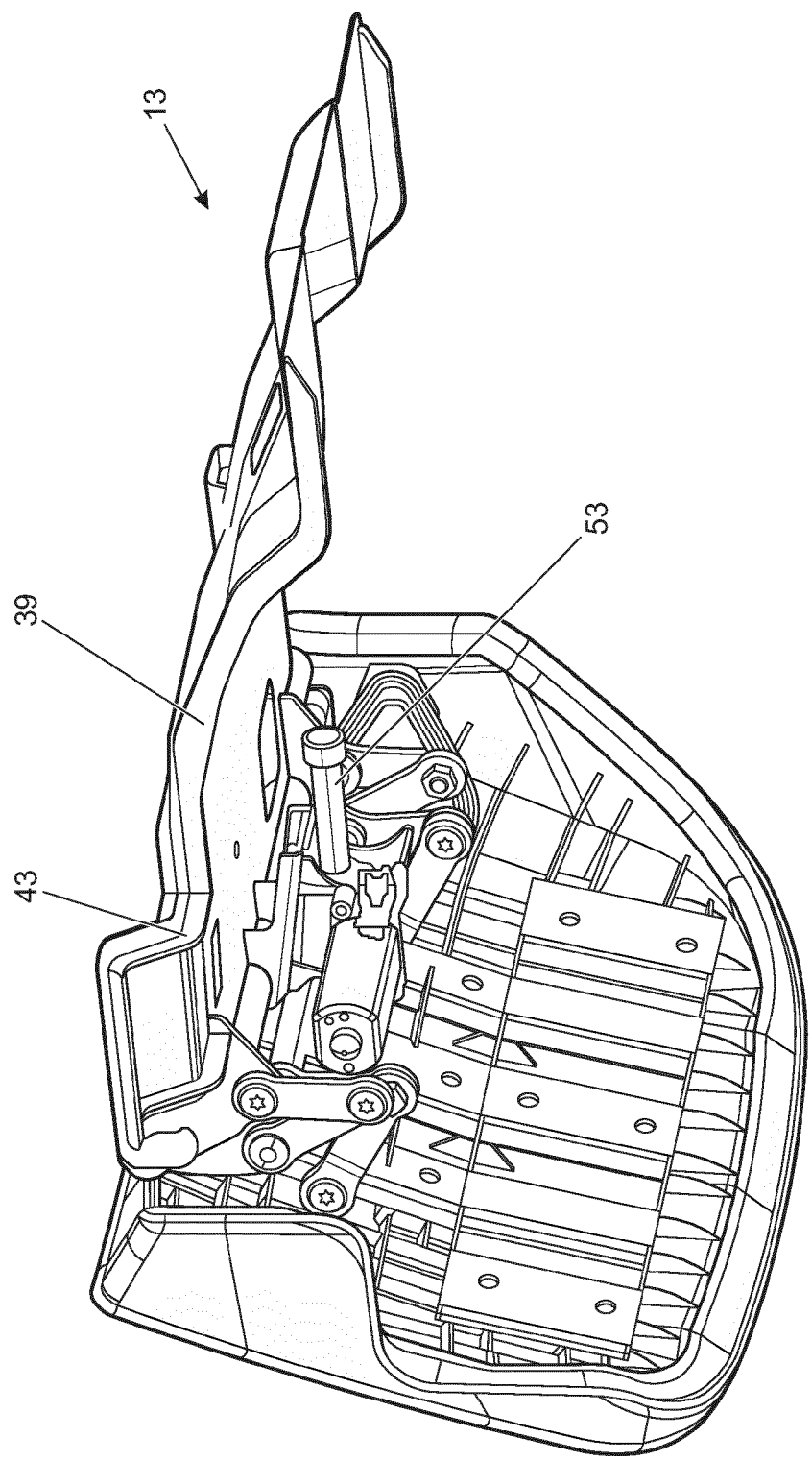
FIG. 5 is a side perspective view of the deployable leg rest assembly in the retracted configuration.
Figure 6:
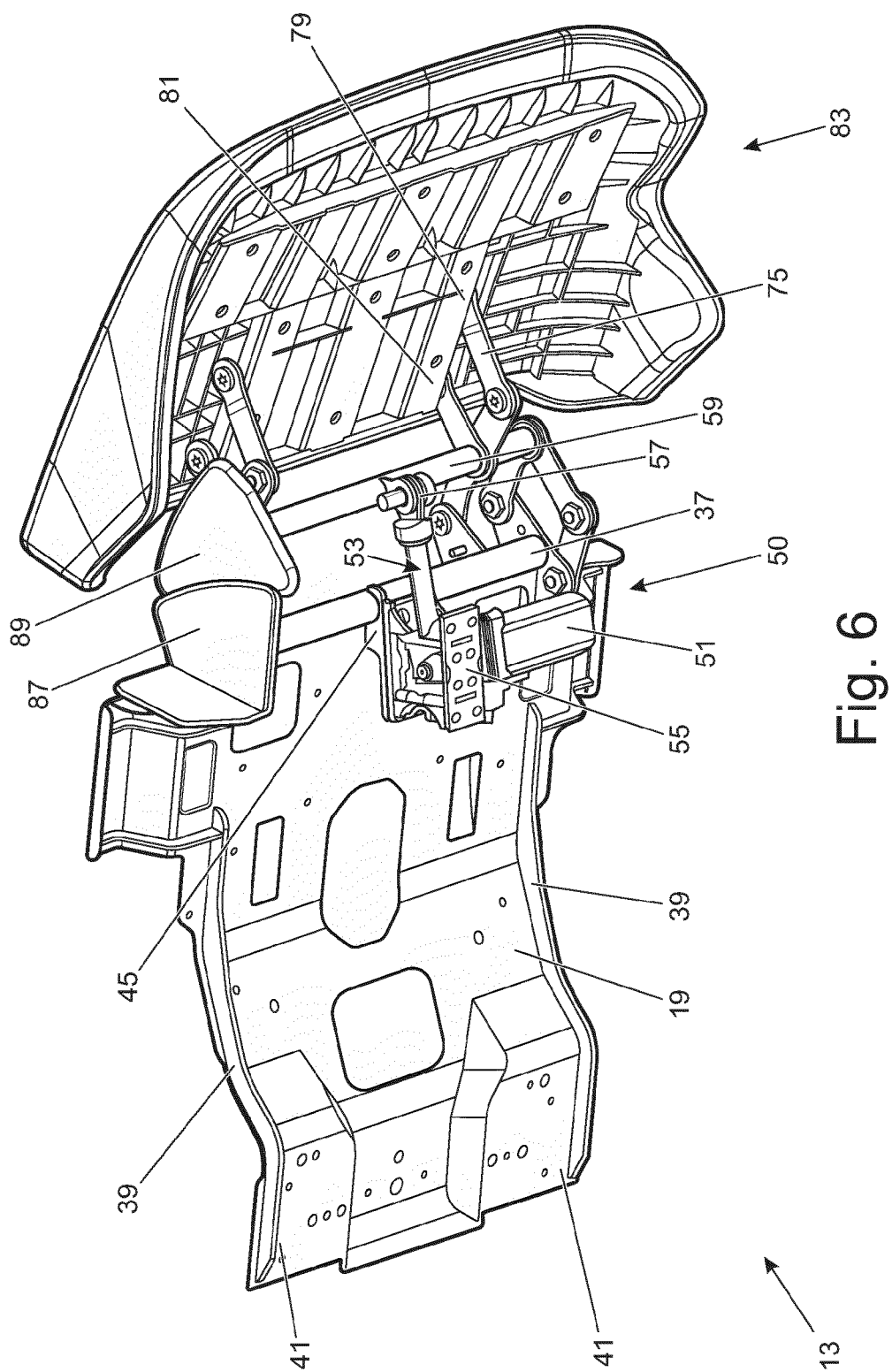
FIG. 6 is a bottom perspective view of the deployable leg rest assembly in the deployed configuration.

As shown in FIGS. 5 and 6, the mounting plate 13 is also provided with lower reinforcement structures as follows: a pair of longitudinally extending flanges 39, extending along the length of the two opposite longitudinal edges 41 of the mounting plate 13; two pairs of transversely extending ribs 43 located on respective undersides of each bracket 25; and a lower reinforcing plate 45 correspondingly positioned with respect to the upper reinforcing plate 35. At the front of the mounting plate 13, the longitudinal flanges 39 each intersect a respective one of each pair of the transversely extending ribs 43.

An actuating apparatus 50 for actuating the deployment mechanism 7 is also shown in FIGS. 5 and 6. The actuating apparatus 50 comprises an electric motor 51, a lead screw actuator 53 and a gearbox 55. The actuating apparatus 50 is mounted to an underside of the mounting plate 13. More particularly, the actuating apparatus 50 is disposed at the front of the mounting plate 13 for positioning in front of the seat pan 21. The electric motor 51 is transversely mounted and is coupled to the gearbox 55 which drivingly engages the lead screw actuator 53. The lead screw actuator 53 is configured to longitudinally extend and retract a coupling 57 pivotally connected to a second transverse spindle 59. The lead screw actuator 53 actuates the deployment mechanism 7 to displace the leg support 5 between said retracted configuration (shown in FIG. 5) and said deployed configuration (shown in FIG. 6). The first and second transverse spindles 37, 59 are arranged substantially parallel to each other.

When the leg support 5 is deployed, the second transverse spindle 59 rotates and translates with respect to the first transverse spindle 37. Other kinematic arrangements are contemplated, for example consisting of a pivoting movement or a translation movement of the second transverse spindle 59 relative the first transverse spindle 37. In the present embodiment, the deployment mechanism 7 comprises left and right four-bar linkage assemblies 60 which define respective left and right variable-geometry parallelograms. The left and right four-bar linkage assemblies 60 are mounted at respective ends of the first and second transverse spindles 37, 59 and control translation of the second transverse spindle 59. The left and right four-bar linkage assemblies 60 have corresponding configurations. However, for the sake of brevity, only the left four-bar linkage assembly 60 will be described herein in detail.

Figure 7:
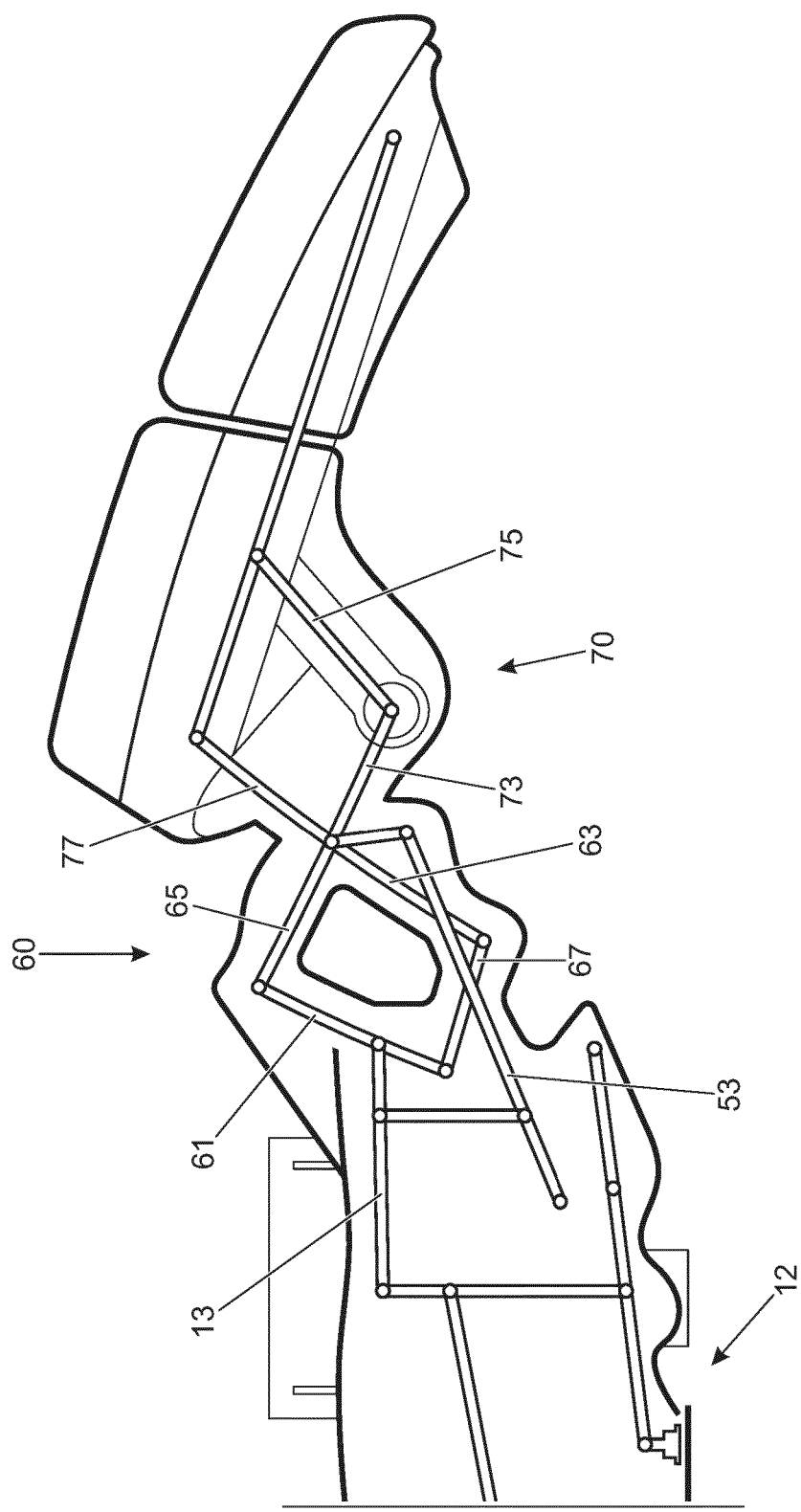
FIG. 7 is a cross sectional side elevation of part of the deployable leg rest assembly, shown in transparency, with superimposed a schematic representation of a mechanical structure formed by the deployable leg rest assembly in the deployed configuration and a seat pan.

As shown in FIG. 4, the left four-bar linkage assembly 60 comprises: a first linkage member 61; a second linkage member 63 disposed opposite said first linkage member 61; a third linkage member 65 pivotally mounted to an upper end of the first linkage member 61; and a fourth linkage member 67 pivotally mounted to a lower end of the first linkage member 61. The second linkage member 63 is pivotally mounted between the third and fourth linkage members 65, 67. The first transverse spindle 37 is fixedly connected to the first linkage member 61 partway along its length, as shown in FIGS. 6 and 7.

When the lead screw actuator 53 (shown schematically in FIG. 7) extends, the parallelogram defined by the four-bar linkage arrangement 60 is elongated to displace the second transverse spindle 59 in a forwards direction away from the mounting plate 13. Conversely, when the lead screw actuator 53 retracts, the parallelogram defined by the four-bar linkage arrangement 60 is shortened to displace the second transverse spindle 59 in a rearwards direction towards the mounting plate 13.

The deployment mechanism 7 also comprises left and right scissor-type assemblies 70 which are inset from the respective left and right four-bar linkages 40. The scissor-type assemblies 70 are arranged to control the angular orientation of the leg support 5 as it travels between said retracted and deployed configurations. The left and right scissor-type assemblies 70 have corresponding configurations. However, for the sake of brevity, only the left scissor-type assembly 70 will be described herein in detail.

The left scissor-type assembly 70 is formed by a locating member 71, a first pivoting member 73, a connecting member 75 and a second pivoting member 77. The connecting member 75 is pivotally mounted to a forward end of the first pivoting member 73 and extends to a first leg support pivotal coupling 79 provided at a mid-point of said leg support 5. The second pivoting member 77 extends to a leg support coupling 81 provided at the end of the leg support 5 closest to the mounting plate 13.

The scissor-type assembly 70 is illustrated schematically in FIG. 7. When the lead screw actuator 53 extends, the scissor-type assembly 70 closes such that the connecting member 75 extends thereby causing the leg support 5 to pivot (in an anticlockwise direction in the view shown in FIG. 7) to said deployed configuration. When the lead screw actuator 53 retracts, the scissor-type assembly 70 opens causing the connecting member 75 to retract and pivot the leg support 5 (in a clockwise direction in the view shown in FIG. 7) to said retracted configuration.

The leg support 5 has an internal support frame 83 made from an injection moulded material which is mounted to the supporting plate 75 as seen in FIG. 6. The support frame 83 is trimmed in leather 85, and a padding material (not shown) is inserted between the leather 85 and the support frame 83. First and second hiders 87, 89 are provided on each side of the deployable leg rest assembly 3 to hide at least a part of the deployment mechanism 7 when the leg support 5 is deployed 4, as shown in FIG. 6. The first hider 87 is mounted to the front of the mounting plate 13 and the second hider 89 is mounted to the first hider 72 and to a corresponding one of the four-bar linkage arrangements 60. The first hider 87 remains stationary when the leg support 5 is deployed. The second hider 89 on each side move together with the deployment mechanism 7 when the deployment mechanism 7 is extended.

In order to install the deployable seat rest assembly 3 to the vehicle seat frame 12, an operator removes at least part of a seat squab 9 of the vehicle seat 1 to access the seat pan 17, and then locates the mounting plate 13 above the seat pan 17. Then, the operator secures the mounting plate 13 to the seat pan 17. This procedure facilitates the installation of the deployable leg rest assembly 3. Further, this procedure enables the seat pan 17 to receive at least part of a load applied, in use, to the leg support 5. Since the seat pan 17 contributes to the discharge of this load on the vehicle seat frame 12, the vehicle seat frame 12 does not require substantial structural modifications for receiving the deployable leg rest assembly 3. As a consequence, any vehicle seat adjustments provided by the vehicle seat frame 12 are less likely to be inhibited by the presence of the deployable leg rest assembly 3.

At least in certain embodiments, the leg rest assembly 3 can be installed without inhibiting any of the other adjustment movements of the vehicle seat 1. Since the mounting plate 13 is mounted to the top of the seat pan, it does not inhibit fore and aft movement of the vehicle seat 1 on the side runners 10. Equally, the leg rest assembly 3 does not inhibit an incline function of the backrest, or the function of raising or lowering the seat.

The leg rest assembly 3 is operated by a toggle switch (not shown) which can be integrated with an on-board control unit. The control unit can determine the current configuration of the leg support 5 (i.e. retracted or deployed) and control the electric motor 51 to displace the leg support 5 to the other of said configurations. When activated, the electric motor 51 drives the lead screw actuator 53 to deploy or retract the leg support 5 (determined by the direction in which the electric motor 51 rotates). The control unit could be configured simultaneously to control other seating functions, for example to recline the backrest 11.

To deploy the leg support 5, the lead screw actuator 53 is operated to extend the second transverse spindle 59, thereby elongating the parallelograms defined by the four-bar linkage arrangements 60 and displacing the second transverse spindle 59 in a forwards direction. The forward displacement of the second transverse spindle 59 closes the scissor-type assembly 70 to rotate the leg support 5 to its substantially horizontal (deployed) configuration. The leg support 5 is thereby displaced from the retracted configuration to the deployed configuration.

To retract the leg support 5, the rotational direction of the electric motor 51 is reversed such that the lead screw actuator 53 is operated to retract the second transverse spindle 59, thereby shortening the parallelograms defined by the four-bar linkage arrangements 60 and displacing the second transverse spindle 59 in a rearwards direction. The rearward displacement of the second transverse spindle 59 opens the scissor-type assembly 70 to rotate the leg support 5 to its substantially vertical (retracted) configuration. The leg support 5 is thereby displaced from the deployed configuration to the retracted configuration.

The leg rest assembly 3 can be installed to the seat frame 12 without altering the H-point location. Moreover, at least in certain embodiments, the leg rest assembly 3 can be installed without the need to alter the shape of the seat squab 9. The leg rest assembly 3 can be mounted to an existing seat frame 12. The leg rest assembly 3 could be fitted after the seat frame 12 has been installed in a vehicle, for example at the end of the assembly process or retro-fitted to a vehicle. The seat frame 12 can be standardised and the leg rest assembly 3 optionally fitted thereto.

Further aspects of the present disclosure are set out in the following numbered paragraphs form part of the present disclosure:

1. A deployable leg rest assembly for a vehicle seat, the deployable leg rest assembly comprising:
 a leg support;
 a mounting plate for mounting to a seat pan of a vehicle seat frame; and
 a deployment mechanism for deploying the leg support, the deployment mechanism connecting the leg support to the mounting plate;
 wherein the mounting plate is arranged to be mounted on top of the seat pan of the vehicle seat frame.

2. A deployable leg rest assembly as described in paragraph 1, wherein at least a portion of the mounting plate is profiled at least substantially to match a corresponding portion of the seat pan.

3. A deployable leg rest assembly as described in paragraph 1, wherein the mounting plate is adapted to define a face-to-face relationship with the seat pan.

4. A deployable leg rest assembly as described in paragraph 1, wherein the mounting plate is configured to extend in a longitudinal direction over part or substantially all of said seat pan.

5. A deployable leg rest assembly as described in paragraph 1, wherein the mounting plate is inclined so as to provide an anti-submarining feature.

6. A deployable leg rest assembly as described in paragraph 5, wherein the mounting plate has a generally S-shaped longitudinal cross section, such that a front portion of the mounting plate is disposed vertically above a rear portion of the mounting plate.

7. A deployable leg rest assembly as described in paragraph 1, wherein the deployment mechanism is adapted to rotate and translate the leg support to a deployed configuration.

8. A deployable leg rest assembly as described in paragraph 1, wherein the deployment mechanism comprises a four-bar linkage arrangement.

9. A deployable leg rest assembly as described in paragraph 1, wherein the deployment mechanism comprises first and second members pivotally coupled to each other, wherein the first member is coupled to a first end of the leg support and the second member is coupled to a second end of the leg support.

10. A deployable leg rest assembly as described in paragraph 9, wherein said first and second members are mounted to the four-bar linkage arrangement.

11. A deployable leg rest assembly as described in paragraph 1 comprising an actuator for actuating the deployment mechanism.

12. A deployable leg rest assembly as described in paragraph 11, wherein the actuator comprises an electric motor drivingly coupled to a lead screw.

13. A deployable leg rest assembly as described in paragraph 11, wherein the actuator is mounted to a first end the mounting plate for positioning at a front end of the seat pan.

14. A deployable leg rest assembly described in paragraph 11, wherein the actuator is located beneath the front portion of the mounting plate.

15. A deployable leg rest assembly as described in paragraph 14, wherein the front portion of the mounting plate defines a cavity for receiving the actuator.

16. A deployable leg rest assembly as described in paragraph 1, wherein said mounting plate is adapted to be mounted to said seat pan by a plurality of mechanical fasteners.

17. A deployable leg rest assembly as described in paragraph 1, wherein the mounting plate comprises one or more reinforcing elements.

18. A deployable leg rest assembly as described in paragraph 17, wherein the one or more reinforcing elements comprise one or more reinforcing flanges extending substantially perpendicularly from the mounting plate.

19. A deployable leg rest assembly for mounting to a vehicle seat frame, the deployable leg rest assembly comprising:
 a leg support;
 a mounting plate for mounting to a seat pan;
 a deployment mechanism for deploying the leg support, the deployment mechanism connecting the leg support to the mounting plate; and
 an actuating apparatus for actuating said deployment mechanism;
 wherein the actuating apparatus is located beneath a front portion of the mounting plate.

20. A vehicle seat frame comprising:
 a seat pan; and
 a deployable leg rest assembly according to any one of the preceding claims.

21. A vehicle seat comprising a vehicle seat frame described in paragraph 20.

22. A vehicle comprising a vehicle seat described in paragraph 21.

23. A method of mounting a deployable leg rest assembly to a seat pan of a vehicle seat frame, the method comprising:
 providing a deployable leg rest assembly comprising a mounting plate adapted to be located above the seat pan; and
 mounting the mounting plate to the seat pan.

The invention claimed is:

1. A deployable leg rest assembly for a vehicle seat, the deployable leg rest assembly comprising:
 a leg support;
 a mounting plate mountable on top of a seat pan of a frame of the vehicle seat; and
 a deployment mechanism that deploys the leg support, wherein the deployment mechanism connects the leg support to the mounting plate, and wherein the deployment mechanism comprises:
  a four-bar linkage; and
  first and second members mounted to the four-bar linkage, wherein the first and second members are pivotally coupled to each other, and wherein the first member is coupled to a first end of the leg support and the second member is coupled to a second end of the leg support.

2. The deployable leg rest assembly of claim 1, wherein at least a portion of the mounting plate is profiled at least substantially to match a corresponding portion of the seat pan.

3. The deployable leg rest assembly of claim 1, wherein the mounting plate is configured to define a face-to-face relationship with the seat pan.

4. The deployable leg rest assembly of claim 1, wherein the mounting plate is configured to extend in a longitudinal direction over at least part of the seat pan.

5. The deployable leg rest assembly of claim 1, wherein the mounting plate is inclined so as to provide an anti-submarining feature.

6. The deployable leg rest assembly of claim 5, wherein the mounting plate has a generally S-shaped longitudinal cross section, such that a front portion of the mounting plate is disposed vertically above a rear portion of the mounting plate.

7. The deployable leg rest assembly of claim 1, wherein the deployment mechanism is configured to rotate and translate the leg support to a deployed configuration.

8. The deployable leg rest assembly of claim 1, further comprising an actuator that actuates the deployment mechanism.

9. The deployable leg rest assembly of claim 8, wherein the actuator comprises an electric motor drivingly coupled to a lead screw.

10. The deployable leg rest assembly of claim 8, wherein the actuator is mounted to a first end of the mounting plate for positioning at a front end of the seat pan.

11. The deployable leg rest assembly of claim 8, wherein the actuator is located beneath a front portion of the mounting plate.

12. The deployable leg rest assembly of claim 11, wherein the front portion of the mounting plate defines a cavity for receiving the actuator.

13. The deployable leg rest assembly of claim 1, wherein the mounting plate is mountable to the seat pan by a plurality of mechanical fasteners.

14. The deployable leg rest assembly of claim 1, wherein the mounting plate comprises one or more reinforcing elements.

15. The deployable leg rest assembly of claim 14, wherein the one or more reinforcing elements comprise one or more reinforcing flanges extending substantially perpendicularly from the mounting plate.

16. A deployable leg rest assembly for mounting to a vehicle seat frame, the deployable leg rest assembly comprising:
a leg support;
a mounting plate mountable to a seat pan;
a deployment mechanism that deploys the leg support, wherein the deployment mechanism connects the leg support to the mounting plate, and wherein the deployment mechanism comprises:
a four-bar linkage; and
first and second members mounted to the four-bar linkage, wherein the first and second members are pivotally coupled to each other, and wherein the first member is coupled to a first end of the leg support and the second member is coupled to a second end of the leg support; and
an actuating apparatus that actuates the deployment mechanism, wherein the actuating apparatus is located beneath a front portion of the mounting plate.

17. A vehicle seat frame, comprising:
a seat pan; and
a deployable leg rest assembly, comprising:
a leg support;
a mounting plate mounted on top of the seat pan; and
a deployment mechanism that deploys the leg support, wherein the deployment mechanism connects the leg support to the mounting plate, and wherein the deployment mechanism comprises:
a four-bar linkage; and
first and second members mounted to the four-bar linkage, wherein the first and second members are pivotally coupled to each other, and wherein the first member is coupled to a first end of the leg support and the second member is coupled to a second end of the leg support.

* * * * *